3,594,235
METHOD OF USING A METAL-AIR CELL WITH A TETRA-ALKYL-SUBSTITUTED AMMONIUM ELECTROLYTE
Paul J. Moran, Ballston Lake, N.Y., assignor to General Electric Company
Filed Aug. 30, 1968, Ser. No. 756,507
Int. Cl. H01m 29/04
U.S. Cl. 136—86       1 Claim

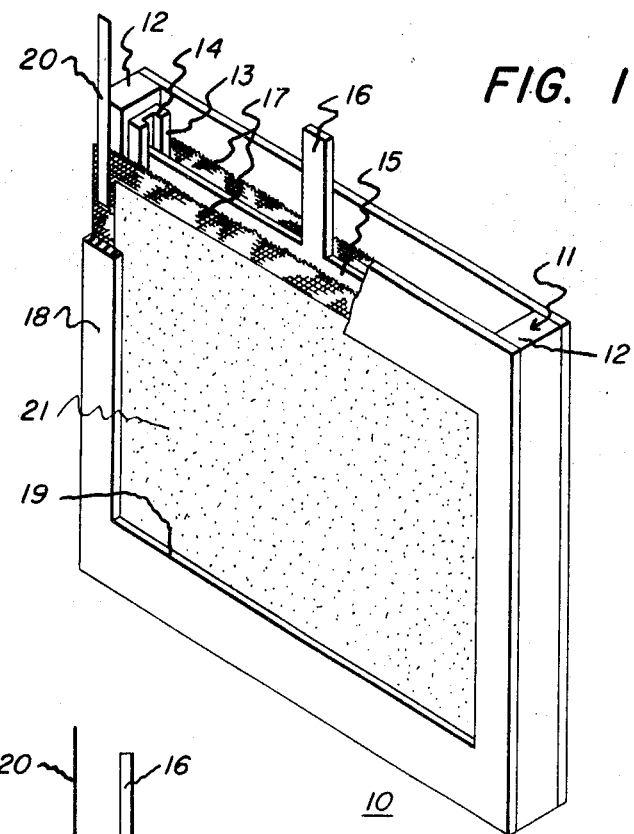
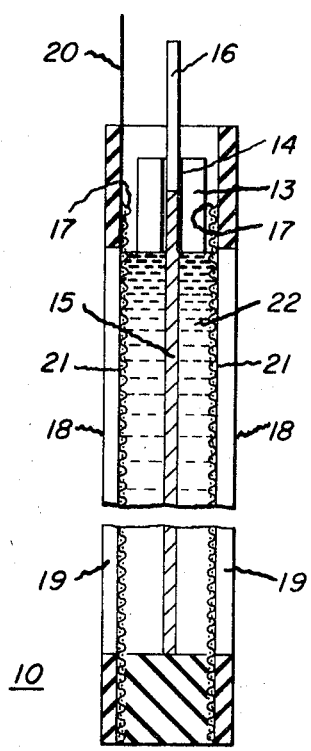
FIG. 1
FIG. 2
INVENTOR:
PAUL J. MORAN,
by Paul R. Webb, II
HIS ATTORNEY

United States Patent Office 3,594,235
Patented July 20, 1971

ABSTRACT OF THE DISCLOSURE

A method of generating electrical energy from a metal-air cell includes providing at least one gas diffusion cathode, supplying an oxygen oxidant to the cathode, providing at least one anode, and providing for the cathode and anode an aqueous electrolyte selected from the class consisting of tetra-alkyl-substituted ammonium hydroxides and tetra-alkyl-substituted ammonium halides. The electrolyte eliminates or substantially reduces the accumulation of carbonate reaction products which are formed from the reaction of carbon dioxide from the air with some other alkaline electrolytes.

---

This invention relates to metal-air cells and to methods of generating electrical energy, and more particularly to such metal-air cells in which an improved electrolyte is employed to eliminate or substantially reduce the accumulation of carbonate material within and on the exterior of the cell and to methods of generating electrical energy from such cell.

The invention described herein was made under Contract No. DAAB–07–67C–0257 with the Department of the Army.

Metal-air cells are galvanic cells which use an oxidant of oxygen, or oxygen from the air as the reactive material consumed by the positive electrode of the cell. The oxygen thereby serves as the cathode depolarizer. Cadmium, magnesium and aluminum are useful anode materials in such cells since they are generally low in cost and light in weight. Alkaline electrolytes are normally employed in metal-air cells, the most commonly used electrolyte being potassium hydroxide in water at various concentrations.

However, during the operation of such a metal-air cell, some alkaline electrolytes have a serious disadvantage in that insoluble carbonate compounds are formed by a reaction between the carbon dioxide in the air and the electrolyte. After such carbonate reaction products are formed in the pores of the cathode and the anode on the interior and exterior surfaces of the cell, the useful life of both the cathode and anode are drastically reduced. My present invention is directed to an improved metal-air cell which reduces substantially or eliminates the carbonate reaction products accumulation in the cell.

It is a primary object of my invention to provide an improved metal-air cell which will function effectively without a carbonate reaction products accumulation thereby operating for a long time period and requiring less maintenance.

It is another object of my invention to provide a method of generating electrical energy from such a metal-air cell.

In accordance with my invention, a metal-air cell comprises at least one gas diffusion cathode, at least one anode, and an aqueous electrolyte of a tetra-substituted ammonium hydroxide or halide.

These and various other objects, features and advantages of the invention will be better understood from the following description taken in connection with the accompanying drawing in which:

FIG. 1 is a perspective view of a metal-air cell embodying my invention; and
FIG. 2 is a vertical sectional view of the metal-air cell shown in FIG. 1.

In the FIGS. 1 and 2 of the drawing, there is shown generally at 10 an improved metal-air cell embodying my invention. Cell 10 has a casing 11 in the form of a U-shaped frame with a pair of opposite frame members 12. A pair of spaced guides 13 are positioned against the interior surfaces of respective members 12. Each guide 13 is provided with a vertical groove 14 to receive an edge of an anode plate 15. A terminal strip 16 is formed integrally with plate 15 and extends upwardly and outwardly from guides 13.

On opposite outer surfaces of casing 11 a metal screen 17 is shown sealed thereto. A face piece 18 is sealed to each of the opposite surfaces of casing 11 and overlies the edges of screen 17. Each of the face pieces 18 is provided with a large opening 19 whereby the portion of screen 17 lying within open portion 19 forms a part of a gas permeable, liquid impermeable cathode electrode which is co-extensive with opening 19. A terminal strip 20 is attached to screen 17 near an edge to provide an electrical connection for the cathode. A cathode 21 is shown co-extensive with each opening 19 and includes the portion of screen 17 within such opening.

In FIG. 2 of the drawing, an electrolyte 22 is shown within metal-air cell 10 between opposite cathodes 21 and anode 15. The improved aqueous electrolyte of my invention is a tetra-substituted ammonium hydroxide or halide.

While cathode 21 is shown in the above form, various types of cathodes are known in the art for employment in a metal-air cell. The type of cathode shown in FIGS. 1 and 2 comprises screen 17 with a coating thereon of catalytic metal, unsupported or supported, and a binder of a suitable material, such as polytetrafluoroethylene, bonding the particles of the catalyst together and to screen 17 thereby resulting in cathode electrode 21. In such a cathode structure, the exterior faces thereof may be coated with a thin film of polytetrafluoroethylene to provide water-proofing for the structures.

Another improved cathode which is suitable for employment in the present invention is described and claimed in the copending application of Paul J. Moran and Harold A. Christopher, Ser. No. 664,366, filed Aug. 30, 1967, which is assigned to the same assigneee as the present application. The cathode electrode in the above-mentioned copending application has an electronically conductive grid, a hydrophobic binder, and electronically conductive, catalytically active carbon particles held together and to the grid by the binder.

While a pair of parallel cathodes are shown spaced from the anode and on opposite sides thereof, a single cathode can be employed which is spaced from the anode. Anode 15 which is positioned between and spaced from the pair of cathodes 21 is formed from a material such as cadmium, magnesium, aluminum or alloys of these metals.

I have discovered that an improved metal-air cell can be constructed by employing at least one gas diffusion cathode, at least one anode, and an aqueous electrolyte of a tetra-substituted ammonium hydroxide or halide. I found that electrical energy can be generated by supplying an oxygen oxidant to the cathode of the above cell.

I have found that when an electrolyte of a tetra-substituted ammonium hydroxide or a tetra-substituted ammonium halide is used in a metal-air cell employing at least one anode, the formation of carbonate reaction products, which are formed from the reaction of carbon dioxide from the air and the electrolyte, is eliminated or substantially reduced. The cell will operate over a longer time period than when an aqueous alkaline solution is employed as the electrolyte which reacts with carbon dioxide. I have found that various tetra-substituted ammonium hydroxides and various tetra-substituted ammonium halides are useful in the practice of my invention. I prefer the tetra-substitution to be an alkyl radical with 1 to 4 carbon atoms. Of these substituted alkyl radicals, I prefer further to employ tetramethyl or tetraethyl substitutions. However, more than one alkyl radical can be substituted in the tetra-substituted ammonium hydroxide or halide.

Examples of metal-air cells with improved electrolytes made in accordance with my invention are set forth below:

EXAMPLE 1

A secondary cadmium metal-air cell was constructed in accordance with FIGS. 1 and 2 of the drawing except that a single cathode was employed. The cathode was formed of a porous nickel substrate on which had been provided a catalyst metal of platinum bonded together and to the screen by polytetrafluoroethylene, in accordance with the teachings of the copending application of Leonard W. Niedrach and Harvey R. Alford, Ser. No. 232,689, filed Oct. 24, 1962, now Pat. No. 3,432,355, and assigned to the same assignee as the present invention. The disclosure of the subject copending patent application is incorporated herein by reference. The anode was cadmium metal while the electrolyte was a 10 weight percent solution of tetraethyl ammonium hydroxide.

EXAMPLE 2

A secondary cadmium metal-air cell was constructed as set forth above in Example 1. However, the electrolyte employed was 10 weight percent solution of tetramethyl ammonium hydroxide.

EXAMPLE 3

A secondary cadmium metal-air cell was constructed as set forth above in Example 1. However, the electrolyte was 25 weight percent solution of tetramethyl ammonium hydroxide.

EXAMPLE 4

The metal-air cells of Examples 1–3 were each operated and the results of these cells operations are set forth below in Table I. In this table, cell voltage in volts is plotted against current density in milliamperes per square centimeter.

TABLE I

| Example No. | Voltage (volts) | | |
|---|---|---|---|
| | 1 | 2 | 3 |
| Current density (ma./cm.$^2$): | | | |
| 5 | 0.75 | 0.80 | 0.82 |
| 10 | 0.70 | 0.78 | 0.79 |
| 20 | 0.65 | 0.74 | 0.76 |
| 30 | 0.58 | 0.69 | 0.72 |
| 40 | 0.50 | 0.65 | 0.68 |
| 50 | 0.42 | 0.62 | 0.65 |

EXAMPLE 5

A primary magnesium metal-air cell was constructed as set forth above in Example 1. The anode was magnesium while the electrolyte was a 10 weight percent solution of tetramethyl ammonium chloride.

EXAMPLE 6

A primary aluminum metal-air cell was constructed as set forth above in Example 1. The anode was aluminum while the electrolyte was a 10 weight percent solution of tetramethyl ammonium chloride.

EXAMPLE 7

The metal-air cells of Examples 5–6 were each operated and the results of these cell operations are set forth below in Table II. In this table, cell voltage in volts is plotted against current density in milliamperes per square centimeter.

TABLE II

| Example No. | Voltage (volts) | |
|---|---|---|
| | 5 | 6 |
| Current density (ma./cm.$^2$): | | |
| 5 | 1.38 | 1.30 |
| 10 | 1.33 | 1.25 |
| 20 | 1.28 | 1.15 |
| 30 | 1.23 | 1.05 |
| 40 | 1.16 | 1.00 |
| 50 | 1.10 | 0.88 |
| 60 | 1.05 | 0.80 |
| 80 | 0.94 | 0.60 |
| 95 | 0.86 | 0.50 |

EXAMPLE 8

Two secondary cadmium metal-air cells were constructed. One cell was made in accordance with Example 2 above. The other cell was made in accordance with Example 1 above but did not contain an electrolyte of my invention. This second cell employed a normally used alkaline solution of 36 weight percent potassium hydroxide. Each of these cells was cycled by charging and discharging at an identical load of 20 ma./cm.$^2$ across each cell. The operation of the second cell, which was not made in accordance with my invention was discontinued after 2 days. Visual inspection of the cell showed the cathode, anode cell interior and cell exterior to be covered with carbonate reaction products. The operation of the cell made in accordance with Example 2 was discontinued arbitrarily after 14 days. There was no carbonate reaction products accumulation on the interior or exterior of the cell.

While other modifications of the invention and variations thereof which may be employed within the scope of the invention have not been described, the invention is intended to include such as may be embraced within the following claim:

What I claim as new and desire to secure by Letters Patent of the United States is:

1. A method of generating electrical energy comprising providing at least one gas diffusion cathode, supplying air to the cathode, providing at least one consumable metal anode, and providing for the cathode and anode an aqueous electrolyte which eliminates the formation of carbonate reaction products which are formed from the reaction of carbon dioxide from the air and the electrolyte, said electrolyte selected from the class consisting of lower tetra-alkyl-substituted ammonium hydroxides and lower tetra-alkyl-substituted ammonium halides.

References Cited

UNITED STATES PATENTS

| 2,403,571 | 7/1946 | Wilke | 136—155 |
| 2,566,114 | 8/1951 | Block | 136—100X |
| 2,921,110 | 1/1960 | Crowley et al. | 136—86 |
| 3,043,898 | 7/1962 | Miller et al. | 136—86 |
| 3,057,760 | 10/1962 | Dereska et al. | 136—137 |
| 3,231,427 | 1/1966 | Kirk et al. | 136—100X |
| 3,457,115 | 7/1969 | Kent | 136—86 |

FOREIGN PATENTS

| 1,015,358 | 12/1965 | Great Britain | 136—154 |

OTHER REFERENCES

Chem. Abstracts, vol. 65, Oct. 10, 1966, "11769" Luminescent Electrolytic Cell—Maricle et al.

ALLEN B. CURTIS, Primary Examiner

U.S. Cl. X.R.

136—154, 155